July 14, 1964      G. C. SCHAEFER      3,140,879
DUAL WHEEL CONSTRUCTION FOR TRAILERS AND THE LIKE
Filed March 27, 1962
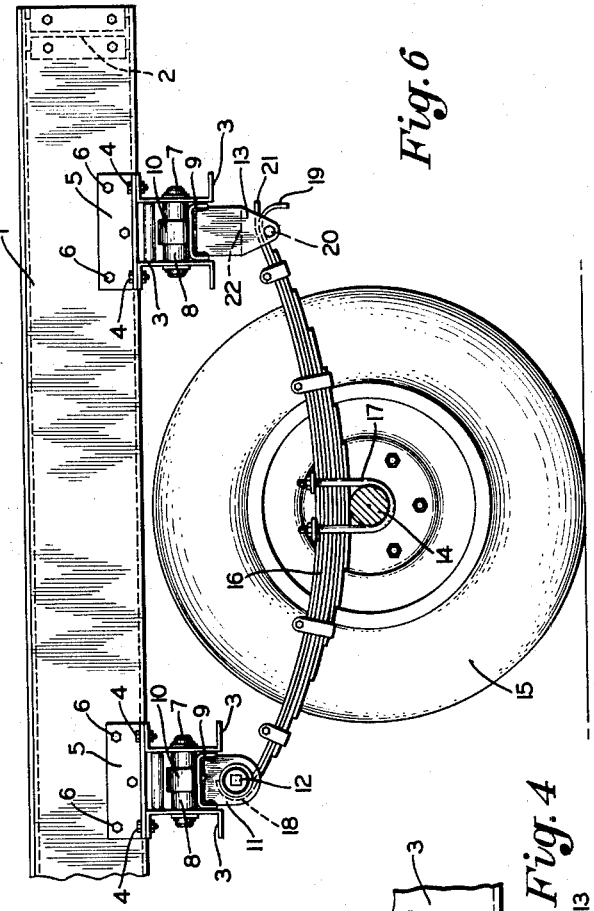
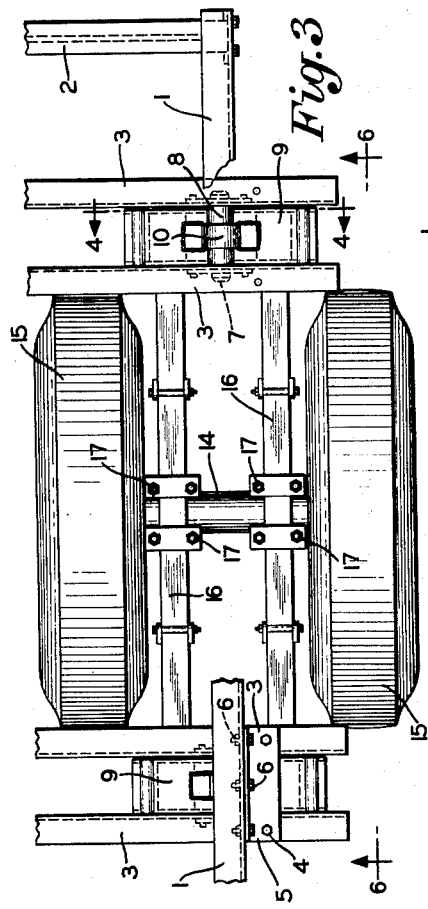
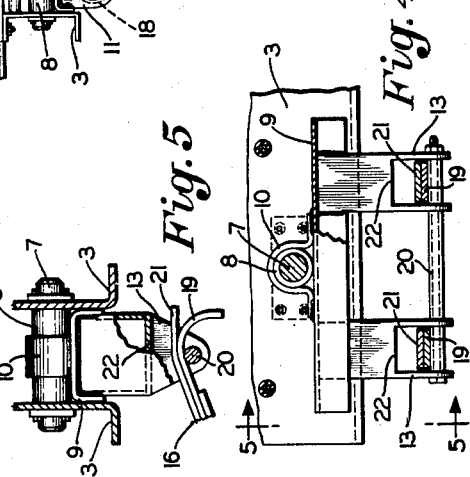
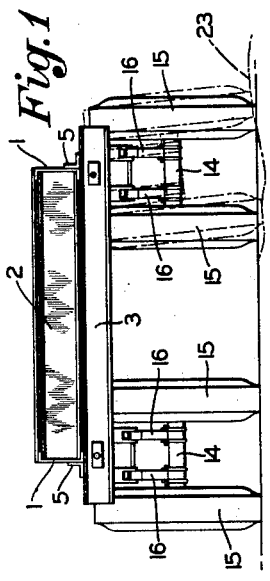
INVENTOR.
Gustave C. Schaefer
BY
Frease, Bishop, Johns & Schick
ATTORNEYS United States Patent Office 3,140,879
Patented July 14, 1964

1

3,140,879
DUAL WHEEL CONSTRUCTION FOR TRAILERS
AND THE LIKE
Gustave C. Schaefer, 608 3rd St. NE., Canton, Ohio
Filed Mar. 27, 1962, Ser. No. 182,777
5 Claims. (Cl. 280—81)

The invention relates to dual wheels for trailers and similar vehicles, and more particularly to such a construction in which the two wheels of a dual wheel are spaced apart and independently mounted upon opposite ends of a short axle.

In the conventional dual wheel construction for trailers and the like, the two wheels of each dual wheel are connected together as a unit, one dual wheel being mounted on each end of a long axle extending transversely across the width of the vehicle.

With such a construction if one wheel of either of the dual wheels rides over an obstruction or drops into a depression in the road, the entire weight of that corner portion of the vehicle is carried upon only one tire instead of upon both tires of that particular dual wheel.

Also, since the two dual wheels are mounted upon opposite ends of an axle extending transversely across the width of the vehicle, this axle and therefore this end of the trailer or similar vehicle is tilted sideways as one wheel of either dual wheel rides over an obstruction. The same is true when the trailer rides upon a crowned road.

It is, therefore, an object of the invention to provide a dual wheel construction which will evenly distribute the load over both tires of each dual wheel.

Another object of the invention is to prevent undue tilting of the trailer or other vehicle upon which the dual wheels are mounted.

A further object of the invention is to provide a dual wheel construction in which the two wheels of a dual wheel are separated and independently mounted upon opposite ends of a short axle located under the adjacent side of the vehicle frame.

A still further object is to provide such a dual wheel construction in which the short axles upon which the dual wheels are mounted are adapted to tilt laterally of the vehicle to permit one wheel to ride over an obstruction or drop into a depression in the road, and to permit both axles to tilt laterally when the trailer or the like rides upon a highly crowned road, without unduly tilting the body of the trailer or other vehicle.

Another object of the invention is to provide such a dual wheel construction of the character referred to in which opposite ends of each short axle are connected to members extending forwardly and rearwardly therefrom and supported upon opposite ends of brackets pivoted so as to tilt transversely of the frame of the vehicle.

It is also an object of the invention to provide such a dual wheel construction in which the opposite ends of the short axle are connected to the opposite ends of the tilting brackets by means of leaf springs.

The above and other objects, apparent from the drawing and following description, may be attained, the above described difficulties overcome and the advantages and results obtained, by the apparatus, construction, arrangements and combinations, subcombinations and parts which comprise the present invention, a preferred embodiment of which, illustrative of the best mode in which applicant has contemplated applying the principle, being set forth in detail in the following description and illustrated in the accompanying drawing.

In the drawing:

FIG. 1 is a rear elevation of a trailer body provided with the improved dual wheel construction to which the invention pertains;

FIG. 2 is a fragmentary side elevation of the rear end

2 portion of the trailer showing a side elevation of one of the dual wheels;

FIG. 3 is an enlarged, fragmentary plan view of the rear corner portion of a trailer, or similar vehicle, showing one of the improved dual wheel constructions;

FIG. 4 is a section on the line 4—4, FIG. 3;

FIG. 5 is an enlarged, fragmentary sectional view of one of the shackles taken on the line 5—5, FIG. 4; and FIG. 6 is a section on the line 6—6, FIG. 3.

The frame or chassis of the trailer may include the longitudinal frame members 1 and the rear transverse member 2. The longitudinal frame members 1 may be in the form of channels as shown, and the rear frame member 2 may be in the form of an I-beam, although other structural shapes or forms may be used so far as the present invention is concerned.

Two spaced pairs of structural members, such as channel members 3—3, are transversely disposed beneath the longitudinal frame members 1, near the rear end of the trailer or other vehicle, and are connected as by bolts 4 to the angle plates 5. These angle plates are shown attached to the longitudinal frame members 1 as by bolts 6. A pivot pin 7 is journalled through each pair of channel members 3, directly below each side frame member 1. A bushing 8 may be located around each pin 7 as indicated in the drawing.

These channel members 3 provide support brackets for the pivoted brackets which will now be described.

Brackets are pivotally mounted upon each of the pivot pins 7, or the bushings 8 thereon, as shown. These brackets may be of any conventional construction. Each comprises a transversely disposed member 9, which may be in the form of a channel, having a bearing portion 10 formed centrally upon its upper side and journalled upon the bushing 8 of the adjacent pivot pin 7.

Each of the pivoted bracket members 9 has a spaced pair of shackle ears depending from each end thereof. These ears may be of conventional construction such as the ears 11 on the forward bracket, with a shackle bolt 12 located therethrough, as in conventional manner, for receiving the eyes of springs or the like between each pair of ears 11. For the purpose of illustration, the rear brackets are shown with ears in the form of slip-shackles indicated at 13.

Instead of having a single axle extending transversely across the width of the trailer frame with a connected pair of dual wheels mounted on each end thereof, a pair of relatively short axles 14 are provided, one for each dual wheels. Each of the dual wheels, instead of being connected together in conventional fashion, comprises two spaced wheels 15 which are independently mounted upon opposite ends of each of the short axles 14.

Any suitable means may be provided for connecting opposite ends of each of the short axles 14 to the depending ears 11 and 13 of each adjacent pivoted bracket 9. Suitable spring means should also be provided for the dual wheels.

For the purpose of illustration, opposite ends of each axle 14 are shown connected by leaf springs 16 to the depending ears 11 and 13 at opposite ends of the forward and rear shackles respectively.

The central portion of each spring 16 is connected by U-bolts 17 to the adjacent end portion of the corresponding axle 14. As above stated, both the forward and rear brackets may be of conventional form such as the front brackets with shackle ears 11 and bolt 12 to receive the eye 18 of a conventional spring.

However, for purpose of illustration, the rear brackets are shown as having the spaced pairs of depending ears 13 in the form of slip-shackles, the adjacent end of each spring 16 having one leaf curved forwardly and downwardly as at 19 so as to rest upon the shackle bolt 20 and the uppermost leaf extending forwardly thereover as at 21, so that it may slidably contact the surface 22, as is customary in slip-shackle construction. This, however, forms no part of the present invention but is merely illustrated to show that various forms of shackles may be used therewith.

As shown in broken lines in FIG. 1, when one of the wheels 15 rides over an obstruction on the ground, as indicated at 23, the corresponding short axle 14 will be permitted to tilt because of the connection thereof to the pivoted brackets. Thus, both axles of each dual wheel will uniformly carry their proportion of the load, the trailer or other vehicle will not be tilted excessively when either axle rides over an obstruction or drops into a depression in the road.

It will also be evident that the spaced pairs of dual wheels carried upon the short axle mounted for independent pivotal movement as disclosed, will permit the wheels to follow the contour of the road without unduly tilting the body of the trailer while providing uniform distribution of the load upon the several wheels.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. In combination with the frame of a trailer and the like, dual wheel construction comprising a pair of aligned, transversely disposed, relatively short axles located one under each side of the frame, a wheel mounted upon each end of each axle, brackets longitudinally pivotally mounted on the frame in front of and behind each axle, said pivoted brackets being disposed transversely of the frame, each bracket having a spaced pair of ears depending from each end thereof, shackle bolts located through said ears, and longitudinally disposed resilient means connected to the end portions of the axles adjacent the wheels at the ends of the axles and to the ears at opposite ends of each bracket.

2. In combination with the frame of a trailer and the like, dual wheel construction comprising a pair of aligned, transversely disposed, relatively short axles located one under each side of the frame, a single wheel mounted upon each end of each axle, brackets longitudinally pivotally mounted on the frame in front of and behind each axle, said pivoted brackets being disposed transversely of the frame, each bracket having a spaced pair of ears depending from each end thereof, shackle bolts located through said ears, and springs connected to the end portions of the axles adjacent the wheels at the ends of the axles and to the ears at opposite ends of each bracket.

3. In combination with the frame of a trailer and the like, dual wheel construction comprising a pair of aligned, transversely disposed, relatively short axles located one under each side of the frame, a wheel mounted upon each end of each axle, spaced pairs of support brackets disposed transversely of the frame and connected to frame in front of and behind each axle, a pivot pin located through each pair of support brackets, a bracket pivoted upon each pivot pin, and resilient means connecting the end portions of the axles adjacent the wheels at the ends of the axles to opposite ends of each pivoted bracket.

4. In combination with the frame of a trailer and the like, dual wheel construction comprising a pair of aligned, transversely disposed, relatively short axles located one under each side of the frame, a wheel mounted upon each end of each axle, elongated transversely disposed brackets longitudinally pivotally mounted on the frame in front of and behind each axle, said pivoted brackets being parallel with said axles, longitudinally disposed resilient means connecting the end portions of the axles adjacent the wheels at the ends of the axles to opposite ends of the brackets, and means for pivotally mounting each bracket on the frame including spaced support brackets on the frame in front of and in rear of each pivoted bracket.

5. In combination with the frame of a trailer and the like, dual wheel construction comprising a pair of aligned, transversely disposed, relatively short axles located one under each side of the frame, a wheel mounted upon each end of each axle, transversely disposed elongated brackets longitudinally, pivotally mounted on the frame in front of and behind each axle, said pivoted brackets being parallel with said axles, longitudinally disposed springs connecting the end portions of the axles adjacent the wheels at the ends of the axles to opposite ends of the brackets, and means for pivotally mounting each bracket on the frame including spaced support brackets on the frame in front of and in rear of each pivoted bracket.

References Cited in the file of this patent

UNITED STATES PATENTS

| | | |
|---|---|---|
| 1,554,102 | Kysor | Sept. 15, 1925 |
| 1,938,142 | Hallenbeck | Dec. 5, 1933 |
| 3,024,038 | Butler | Mar. 6, 1962 |

FOREIGN PATENTS

| | | |
|---|---|---|
| 144,596 | Australia | Jan. 4, 1952 |